(12) United States Patent
Yu et al.

(10) Patent No.: US 9,185,195 B2
(45) Date of Patent: Nov. 10, 2015

(54) SPRING STRUCTURE AND SLIDE PHONE USING SPRING STRUCTURE

(71) Applicant: Huawei Device Co., LTD, Shenzhen (CN)

(72) Inventors: Jiao Yu, Shanghai (CN); Xin Zhu, Shanghai (CN); Bo Huang, Shanghai (CN); Peng Wu, Shanghai (CN); Liang Zou, Shenzhen (CN)

(73) Assignee: Huawei Device Co., LTD., Shenzhen (CN)

( * ) Notice: Subject to any disclaimer, the term of this patent is extended or adjusted under 35 U.S.C. 154(b) by 7 days.

(21) Appl. No.: 14/132,939

(22) Filed: Dec. 18, 2013

(65) Prior Publication Data

US 2014/0106830 A1    Apr. 17, 2014

Related U.S. Application Data

(63) Continuation of application No. PCT/CN2012/081395, filed on Sep. 14, 2012.

(30) Foreign Application Priority Data

Sep. 27, 2011   (CN) .......................... 2011 1 0296461

(51) Int. Cl.
  *H04M 1/00*     (2006.01)
  *H04M 1/02*     (2006.01)
(52) U.S. Cl.
  CPC .......... *H04M 1/0235* (2013.01); *H04M 1/0237* (2013.01)

(58) Field of Classification Search
  CPC .................................................... H04M 1/0237
  See application file for complete search history.

(56) References Cited

U.S. PATENT DOCUMENTS

| | | | | |
|---|---|---|---|---|
| 2007/0218963 | A1* | 9/2007 | Kim ........................... | 455/575.4 |
| 2008/0058039 | A1* | 3/2008 | Lee et al. ................... | 455/575.4 |

FOREIGN PATENT DOCUMENTS

| | | | |
|---|---|---|---|
| CN | 1961491 | A | 5/2007 |
| CN | 101420472 | A | 4/2009 |
| CN | 201282488 | Y | 7/2009 |
| CN | 101710908 | A | 5/2010 |
| CN | 201523403 | U | 7/2010 |

(Continued)

OTHER PUBLICATIONS

Extended European Search Report received in Application No. 12837402.2-1972 mailed Apr. 10, 2014, 7 pages.

(Continued)

*Primary Examiner* — Justin Lee
(74) *Attorney, Agent, or Firm* — Slater & Matsil, L.L.P.

(57) ABSTRACT

A spring structure includes a support body, a first support rod, a second support rod, a first spring, a second spring, a first mounting member, and a second mounting member used for connecting to a lower shell of the slide phone. An installation hole running through the support body is disposed on the support body. One end of the first support rod is connected to the first mounting member and the other end is inserted in the installation hole of the support body. The first support rod may move along the installation hole and is sleeved with the first spring. One end of the second support rod is connected to the second mounting member and the other end is inserted in the installation hole of the support body.

14 Claims, 4 Drawing Sheets

(56) References Cited

FOREIGN PATENT DOCUMENTS

| CN | 102355512 | A  | 2/2012  |
|----|-----------|----|---------|
| JP | 2009124669 | A  | 6/2009  |
| WO | 2006031078 | A1 | 3/2006  |
| WO | 2008038936 | A1 | 4/2008  |
| WO | 2009145558 | A2 | 12/2009 |

OTHER PUBLICATIONS

Chinese Office Action received in Application No. 201110296461.4 mailed Jun. 5, 2013, 7 pages.
International Search Report and Written Opinion received in Application No. PCT/CN2012/081395 mailed Dec. 20, 2012, 14 pages.

* cited by examiner

SPRING STRUCTURE AND SLIDE PHONE USING SPRING STRUCTURE

CROSS-REFERENCE TO RELATED APPLICATIONS

This application is a continuation of International Application No. PCT/CN2012/081395, filed on Sep. 14, 2012, which claims priority to Chinese Patent Application No. 201110296461.4, filed on Sep. 27, 2011, both of which are hereby incorporated by reference in their entireties.

TECHNICAL FIELD

The present invention relates to communication terminals, and in particular, to a spring structure and a slide phone using the spring structure.

BACKGROUND

At present, slide phones are more and more popular among people, especially among young and fashionable people. A spring structure, as an accessory for connecting an upper sliding cover and a lower sliding cover of a slide phone, may be said to be the most important part in the slide phone. The spring structure functions to implement semi-automatic opening or closing of the slide phone by applying a force through compression and stretching of the spring structure in a process of pushing and closing a sliding cover.

A spring structure in the prior art generally includes two pieces of plate-shaped sheet metal that cooperate with each other for sliding and a compressed spring disposed between the two pieces of sheet metal. One piece of sheet metal has a sliding groove disposed at two side edges, and the other piece of sheet metal has a sliding rail which cooperates with the sliding groove for sliding and is disposed at two side edges. The two pieces of sheet metal are connected to two shells of a slide phone through a structure such as a screw or a fastener, respectively. Its function principle is that, when a hand pushes an upper shell or a lower shell of the slide phone, the two pieces of sheet metal connected to the shells also slide through the sliding groove and the sliding rail that cooperate with each other, and in a sliding process, the compressed spring connected to the sheet metal may implement, through its elastic force, semi-automatic relative sliding of the two pieces of sheet metal, thereby implementing opening and closing effects of the slide phone finally.

The foregoing spring structure has the following technical defects. First, the spring structure includes two pieces of sheet metal and a compressed spring, resulting in a complicated structure, a complicated processing technique and a high manufacturing cost. Second, due to the existence of the two pieces of sheet metal, the spring structure occupies a greater thickness space, resulting in difficulty satisfying light and thin requirements for a cell phone. Third, the compressed spring in the spring structure has a lot of spring steel inside, resulting in a complicated structure.

SUMMARY OF THE INVENTION

Embodiments of the present invention provide a spring structure and a slide phone using the spring structure, so as to simplify a structure of the spring structure and reduce manufacturing costs.

The present invention provides a spring structure, including a support body, a first support rod, a second support rod, a first spring, a second spring, a first mounting member used for connecting to an upper shell of a slide phone, and a second mounting member used for connecting to a lower shell of the slide phone. An installation hole running through the support body is disposed on the support body. One end of the first support rod is connected to the first mounting member and the other end is inserted in the installation hole of the support body. The first support rod may move along the installation hole and is sleeved with the first spring. One end of the second support rod is connected to the second mounting member, and the other end is inserted in the installation hole of the support body. The second support rod may move along the installation hole and is sleeved with the second spring.

The present invention provides a slide phone using the spring structure of the present invention, including an upper shell, a lower shell, and the spring structure. A sliding rail is disposed on the upper shell, and a sliding groove is disposed on the lower shell. A first mounting member in the spring structure is connected to the upper shell of the slide phone, and a second mounting member in the spring structure is connected to the lower shell of the slide phone.

In the spring structure and the slide phone using the spring structure of the present invention, parts such as the first support rod, the second support rod, and the mounting members used for directly connecting to the shells of the slide phone are disposed on the spring structure, thereby solving problems in the prior art of a complicated structure and a high cost of the spring structure, simplifying the structure of the spring structure, and reducing the manufacturing cost.

BRIEF DESCRIPTION OF THE DRAWINGS

To illustrate the technical solutions in the embodiments of the present invention more clearly, accompanying drawings required for describing the embodiments are introduced briefly in the following. Apparently, the accompanying drawings in the following description are only some embodiments of the present invention, and persons of ordinary skill in the art may further obtain other drawings according to these accompanying drawings without creative efforts.

Figure 1:
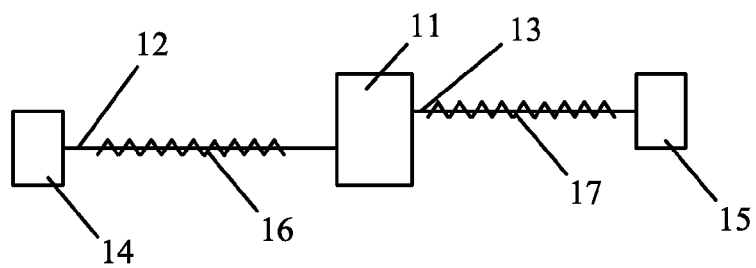
FIG. 1 is a schematic diagram of a structure principle of Embodiment 1 of a spring structure according to the present invention.

The following table provides a description of the reference numerals used in the figures.

| 11-support body; | 12-first support rod; | 13-second support rod; |
|---|---|---|
| 14-first mounting member; | 15-second mounting member; | 16-first spring; |
| 17-second spring; | 18-first branch rod; | 19-second branch rod; |
| 20-first bent portion; | 21-third branch rod; | 22-fourth branch rod; |
| 23-second bent portion; | 24-first slot; | 25-second slot; |

| 26-through hole; | 27-first support body; | 28-second support body; |
| --- | --- | --- |
| 29-third spring; | 30-clamping head; | 31-upper shell; |
| 32-lower shell; | 33-spring structure; | 34-sliding rail; |
| 35-sliding groove; | 36-first clamping member; | 37-second clamping member. |

DETAILED DESCRIPTION OF ILLUSTRATIVE EMBODIMENTS

In order to make the objectives, technical solutions, and advantages of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

A first embodiment (Embodiment 1) will be described with respect to FIG. 1. FIG. 1 is a schematic diagram of a structure principle of Embodiment 1 of a spring structure according to the present invention, and this figure shows a structure form of the spring structure. As shown in FIG. 1, the spring structure in this embodiment may include a support body 11, a first support rod 12, a second support rod 13, a first mounting member 14, a second mounting member 15, a first spring 16, and a second spring 17.

An installation hole (not shown in the figure) is disposed on the support body 11, where the installation hole may run through the support body 11, that is, run from one end of the support body 11 to the other end. One end of the first support rod 12 and one end of the second support rod 13 are connected at two sides of the support body 11, respectively, and the other end of the first support rod 12 and the other end of the second support rod 13 are each connected to one mounting member.

Specifically, one end of the first support rod 12 is connected to the first mounting member 14 and the other end is inserted in the installation hole of the support body 11, and the first support rod 12 is sleeved with the first spring 16. In addition, one end of the second support rod 13 is connected to the second mounting member 15 and the other end is inserted in the installation hole of the support body 11, and the second support rod 13 is sleeved with the second spring 17. The first mounting member 14 may be used for connecting to an upper shell of a slide phone, and the second mounting member 15 may be used for connecting to a lower shell of the slide phone. Alternatively, the first mounting member 14 may also be used for connecting to a lower shell of a slide phone, and correspondingly, the second mounting member 15 may be used for connecting to an upper shell of the slide phone.

The first mounting member 14 under stress may drive the first support rod 12, so that the first support rod 12 moves along the installation hole of the support body 11, and the second mounting member 15 under stress may also drive the second support rod 13, so that the second support rod 13 moves along the installation hole of the support body 11.

A working principle of the spring structure in this embodiment is as follows. For example, when a slide phone is to be opened, a hand applies a push force to the upper shell of the slide phone, and because the mounting member is connected to the shell (for a specific connection relationship, reference may be made to the foregoing description), the upper shell may drive, under the push force of the hand, the mounting member connected to the upper shell to move. Meanwhile, because the mounting member is also connected to the support rod, and the support rod is movably inserted in the installation hole of the support body, that is, the support rod may move in the installation hole, the mounting member may drive the support rod to move to a direction of the support body, and the support rod is pushed out from the other end of the support body. In this process, the spring between the mounting member and the support body is compressed under stress. When a compression elastic force reaches a certain limit, the spring may rebound, push the mounting member away, and then drive the upper shell to move, so that the upper shell and the lower shell slide with respect to each other, thereby implementing a sliding effect of the shells.

For example, it is assumed that a maximum relative sliding distance between the upper shell and the lower shell is A when the slide phone is completely opened. For example, when the hand pushes only for a distance $A*\frac{1}{3}$, the spring on the support rod reaches a limit of the compression elastic force. In this case, the spring rebounds, pushes the mounting member, and then drives the shell to continue the relative sliding. For example, the first spring 16 rebounds and pushes the first mounting member 14 to drive the upper shell to move, and the second spring 17 rebounds and pushes the second mounting member 15 to drive the lower shell to move, so that the sliding rail of the upper shell and the sliding groove of the lower shell cooperate with each other for sliding, thereby reaching the foregoing relative sliding distance A. That is, in a process of opening the slide phone, the springs in the spring structure implement a semi-automatic opening effect of the shells depending on its elastic force. A working principle of closing the slide phone is similar to the foregoing description, and is not repeatedly described.

Compared with the prior art, the spring structure in this embodiment may be directly connected to the shells of the slide phone because two pieces of plate-shaped sheet metal are removed, thereby greatly simplifying a structure and a processing technique of the spring structure and reducing manufacturing costs. Moreover, the structure of the spring structure in this embodiment is simpler than a compressed spring structure in the prior art. In addition, the spring structure saves thickness space occupied by the original sheet metal, thereby satisfying light and thin requirements for a cell phone.

In the spring structure in this embodiment, parts such as the first support rod, the second support rod, and the mounting members used for directly connecting to the shells of the slide phone are disposed, thereby solving problems in the prior art of a complicated structure and a high cost of the spring structure, simplifying the structure of the spring structure, and reducing the manufacturing cost.

Figure 2:
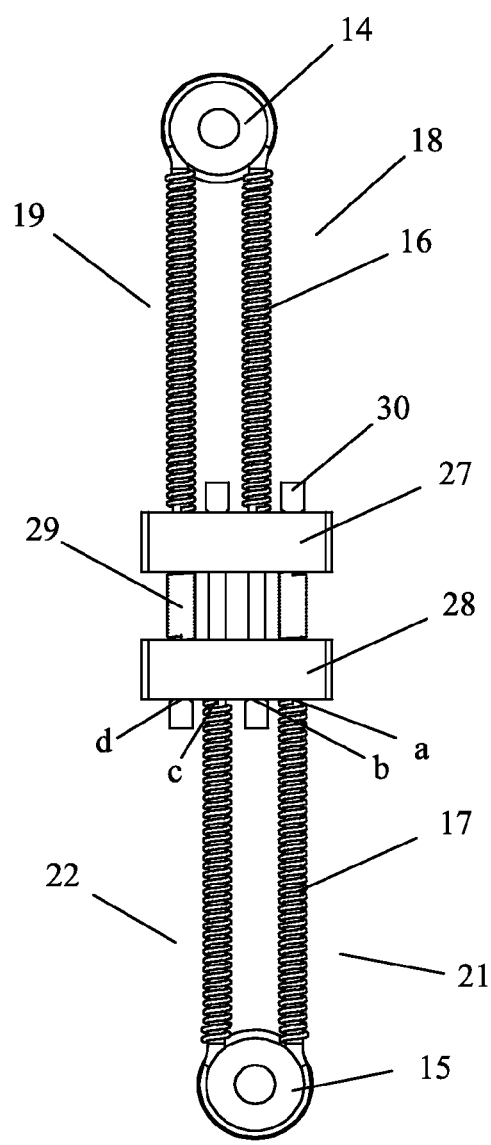
FIG. 2 is a schematic diagram of an overall structure of Embodiment 2 of a spring structure according to the present invention.
Figure 3:
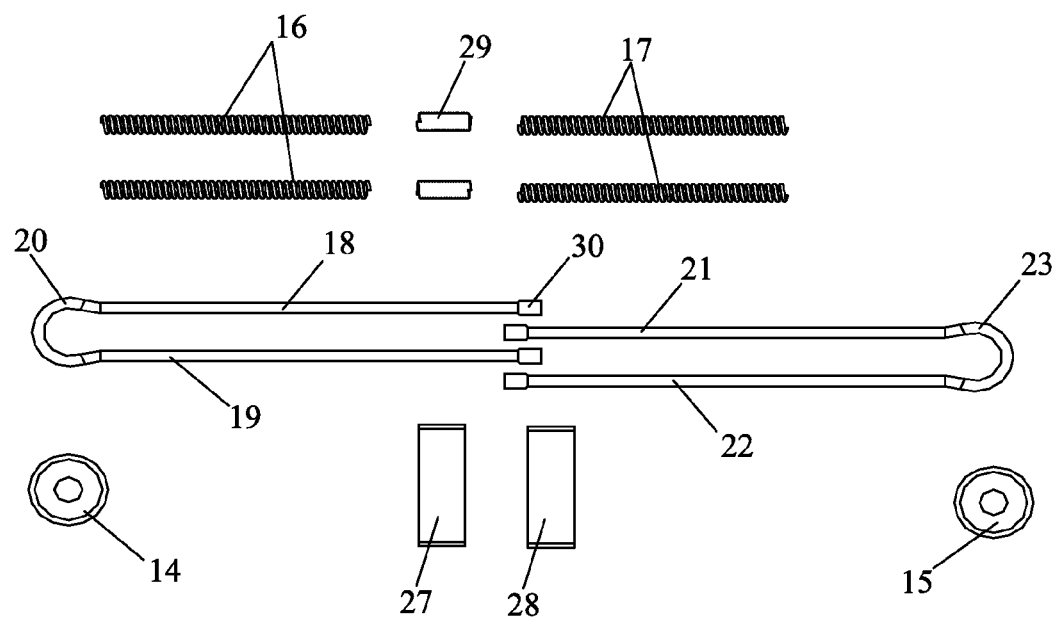
FIG. 3 is an exploded schematic structural diagram of FIG. 2.

A second embodiment (Embodiment 2) will be described with respect to FIGS. 2 and 3. FIG. 2 is a schematic diagram of an overall structure of Embodiment 2 of a spring structure according to the present invention. FIG. 3 is an exploded schematic structural diagram of FIG. 2. In this embodiment, the structure described in Embodiment 1 is described with a specific structure example. As shown in FIG. 2, a general structure principle of the spring structure is the same as that in Embodiment 1. In this embodiment, a first support rod and a second support rod may be U-shaped.

The first support rod may include a first branch rod 18 and a second branch rod 19 that are parallel to each other and a first bent portion 20 connecting the two rods. The first bent portion 20 is connected to a first mounting member 14. The first branch rod 18 and the second branch rod 19 are each sleeved with a first spring 16. Specifically, each branch rod may be sleeved with one first spring 16.

The second support rod may include a third branch rod 21 and a fourth branch rod 22 that are parallel to each other and a second bent portion 23 connecting the two rods. The second bent portion 23 is connected to a second mounting member 15, and the third branch rod 21 and the fourth branch rod 22 are each sleeved with a second spring 17. Specifically, each branch rod may be sleeved with one second spring 17.

Moreover, as shown in FIG. 2, the first branch rod 18, the second branch rod 19, the third branch rod 21, and the fourth branch rod 22 are inserted in the support body in a staggered manner. By disposing the U-shaped support rods, there may be four branch rods. More branch rods and a staggered insertion structure may make the spring structure in this embodiment have a more stable structure and bear a balanced force, have a better feel in use, and further make the spring structure have a longer service life.

Figure 4:
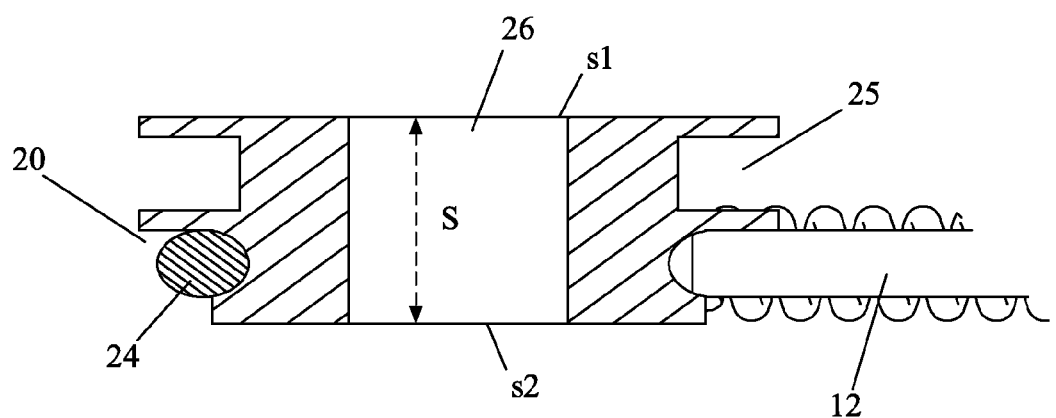
FIG. 4 is a sectional view of a structure of a mounting member in FIG. 2.

Furthermore, in the spring structure in this embodiment, for a connection structure of the mounting member and the support rod, reference may be made to FIG. 4. FIG. 4 is a sectional view of a structure of a mounting member in FIG. 2. The first mounting member 14 is taken as an example for description in FIG. 4. A first slot 24 and a second slot 25 are disposed apart on the first mounting member 14 along a thickness direction. The first bent portion 20 of the first support rod 12 is clamped in the first slot 24. The second slot 25 is used for connecting to an upper shell of a slide phone, and, for example, may be connected to a convex wall disposed on the upper shell. The thickness direction is an S direction shown in FIG. 4. The S direction refers to a direction from a first surface s1 to a second surface s2 of the mounting member or a direction from a second surface s2 to a first surface s1 of the mounting member.

A structure of the second mounting member is the same as the structure shown in FIG. 4. Specifically, a third slot and a fourth slot that are used for connecting to the lower shell of the slide phone are disposed apart on the second mounting member along a thickness direction. The second bent portion of the second support rod is clamped in the third slot.

The connection structure of the mounting member is very simple, it is only required to dispose two slots on the mounting member, and when the mounting member is connected to the support rod and the shell, it is only required to fixedly clamp certain parts of the support rod and the shell in the foregoing slots, so a manufacturing technique is simple and assembly is simple and fast.

Furthermore, as shown in FIG. 4, in this embodiment, a through hole 26 running through two end faces is further disposed on the mounting member along the thickness direction. The through hole 26 is used for an installing tool to penetrate, so that a tool such as tweezers may be inserted into the through hole 26, thereby facilitating assembly and disassembly of the whole spring structure and the shells of the slide phone.

Furthermore, as shown in FIG. 2 and FIG. 3, two support bodies may exist in this embodiment, that is, a first support body 27 and a second support body 28 are included. Installation holes used for insertion of the support rods are disposed on the two support bodies, and the installation holes on the two support bodies are disposed in a one to one corresponding manner, so that the support rod can simultaneously penetrate into the installation holes on the two support bodies.

Specifically, the first support rod penetrates into the installation hole on the first support body 27 and then into the installation hole on the second support body 28. In addition, the first spring 16 is sleeved on the first support rod between the first mounting member 14 and the first support body 27.

The second support rod penetrates into the installation hole on the second support body 28 and then into the installation hole on the first support body 27. In addition, the second spring 17 is sleeved on the second support rod between the second mounting member 15 and the second support body 28.

Moreover, at least two third springs 29 are disposed between the first support body 27 and the second support body 28. The third springs 29 are sleeved on the first support rod or the second support rod, and are symmetrically disposed with respect to a longitudinal center line of the whole first support rod and second support rod.

For example, as shown in FIG. 2, four installation holes may be disposed on each of the first support body 27 and the second support body 28, and the four installation holes include a first installation hole a, a second installation hole b, a third installation hole c, and a fourth installation hole d. The first branch rod 18 and the second branch rod 19 penetrate into the second installation hole b and the fourth installation hole d, respectively, and the third branch rod 21 and the fourth branch rod 22 penetrate into the first installation hole a and the third installation hole c, respectively.

In this embodiment, two third springs 29 may be disposed, where one is sleeved on the third branch rod 21 between the first support body 27 and the second support body 28, and the other is sleeved on the second branch rod 19 between the first support body 27 and the second support body 28. The two third springs 29 are symmetrically disposed with respect to the longitudinal center line of the whole first support rod and second support rod. The longitudinal center line is a center line between the third branch rod 21 and the second branch rod 19, the center line is parallel to the third branch rod 21 and the second branch rod 19, and the third branch rod 21 and the second branch rod 19 are symmetrical with respect to the center line. Furthermore, four third springs 29 may be further disposed, that is, the third spring 29 is also sleeved on each of the first branch rod 18 and the fourth branch rod 22 between the first support body 27 and the second support body 28. Compared with the use of two springs, the use of four springs may make the spring structure bear a more balanced and stable force and prolong service life of the whole spring structure.

In this embodiment, disposing two support bodies has a better effect than disposing one support body because many problems may occur if one support body is disposed. For example, if the support body is too narrow, it is very difficult to ensure evenness of the whole structure, a product is easily distorted, the structure may scrape the shells during use, a borne force is very imbalanced, and a sliding feel is affected. If the support body is too wide, a problem may occur in an injection molding technique during manufacturing. A flaw is generated due to insufficient injection, thereby affecting strength and service life of the whole structure. Moreover, when one support body is used, in order to keep a force borne by the structure balanced and avoid force torsion, the support rod and the spring need to penetrate into the inside of the whole support body, and for the purpose of molding, a thick enough plastic wall is needed at the external side of the through hole in the support body, which results in an increase in total thickness of the support body, an increase in thickness of the spring structure, and an increase in total thickness of a cell phone. In the structure in this embodiment, the spring is only disposed outside the support body, and the spring may not be disposed between the two support bodies, so total thickness of the support body does not need to be increased, thereby facilitating light and thin requirements for a cell phone.

Moreover, in this embodiment, the support rod penetrates into the installation hole running through the support body, and the support body may slide along the support rod. Assuming that the third spring 29 is not disposed between two support bodies, balance of the force borne by the whole spring structure and stability are not good. Moreover, when the shell drives the mounting member to extrude the spring, the spring pushes the two support bodies to move along the support rod to get close to each other, so that it is not easy for the spring to reach a large compression elastic force. Therefore, it may take a long time to rebound resulting in a use effect that is not good and negatively affecting a push feel. When the third spring 29 is disposed between the two support bodies, the symmetrically disposed third spring 29 may make the structure more stable, and when the shell drives the mounting member to extrude the spring, the third spring 29 may prop the support body, so that the support body also applies an extrusion force to the spring. Therefore, the spring may reach a limit of the compression elastic force more quickly, and reaction is fast.

Furthermore, in this embodiment, a clamping head 30 may be disposed on an end which is of each of the first support rod and the second support rod and penetrates out of the support body, and the clamping head 30 may fix the support rod onto the support body. In specific implementation, the support rod may penetrate into the installation hole of the support body first, and then an end head part extending out of the support body is made into the clamping head 30 of the structure shown in FIG. 2 and FIG. 3. For example, the end head may be extruded to be a sheet, which may be used as the clamping head 30.

Furthermore, to reduce costs, the support body in this embodiment may be made of a plastic material. In addition, the mounting member needs to be connected to the shell and bears an extrusion force continuously, and therefore, the mounting member made of a metal material may be used, so as to enhance strength and service life of the spring structure.

Figure 5:
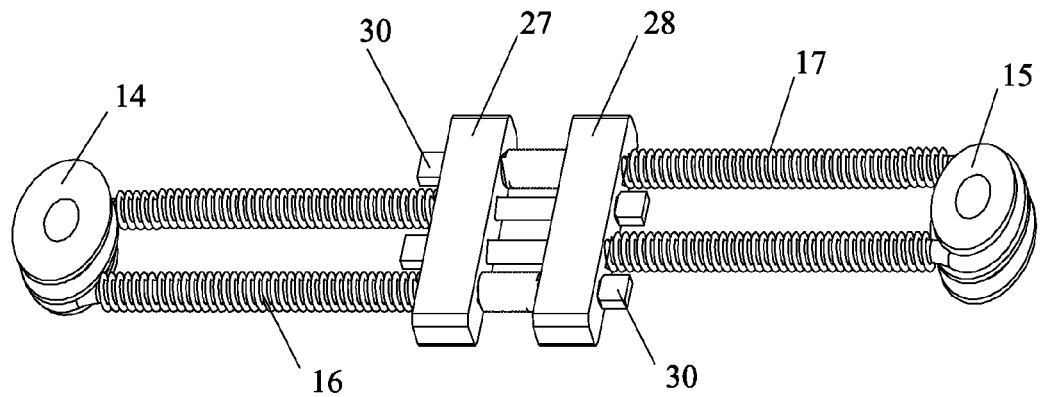
FIG. 5 is a schematic diagram of a free state of springs in Embodiment 2 of the spring structure according to the present invention.
Figure 6:
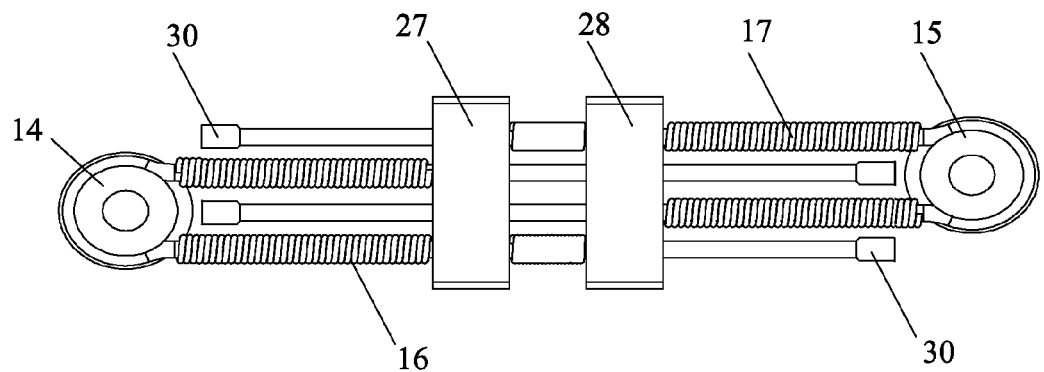
FIG. 6 is a schematic diagram of a compressed state of the springs in Embodiment 2 of the spring structure according to the present invention.

A working principle of the spring structure in this embodiment is similar to that described in Embodiment 1. A working process of the spring structure is specifically described with reference to FIG. 5 and FIG. 6. FIG. 5 is a schematic diagram of a free state of springs in Embodiment 2 of the spring structure according to the present invention. FIG. 6 is a schematic diagram of a compressed state of the springs in Embodiment 2 of the spring structure according to the present invention. As shown in FIG. 5 and FIG. 6, a process of opening a slide phone is taken as an example. It is assumed that a maximum relative sliding distance between an upper shell and a lower shell is A when the slide phone is completely opened. Before the opening process is started, the springs of the spring structure are in a free state (the springs are not in the free state completely, but about a 1 mm pre-pressed distance exists) as shown in FIG. 5.

When the opening process is started, a hand pushes the upper shell of the slide phone, so that the upper shell and the lower shell slide with respect to each other. In a process that the upper shell and the lower shell slide with respect to each other, the first mounting member 14 connected to the upper shell is driven by the upper shell to move towards the first support body 27, and the second mounting member 15 connected to the lower shell is driven by the lower shell to move towards the second support body 28.

In this embodiment, the support rod is movably inserted in the installation hole of the support body, that is, the support rod may move in the installation hole. In the moving process of the mounting member, compared with that in FIG. 5, the clamping head 30 on the end head of the first support body 27 obviously extends out of the support body for a longer distance, and similarly, compared with that in FIG. 5, the clamping head 30 on the end head of the second support body 28 also obviously extends out of the support body for a longer distance. As shown in FIG. 6, both the first spring 16 between the first mounting member 14 and the first support body 27 and the second spring 17 between the second mounting member 15 and the second support body 28 are in a compressed state under stress.

It is assumed that when the hand pushes only for a distance A*⅓, the spring on the support rod reaches the limit of the compression elastic force. In this case, the spring may rebound, and an elastic force of the spring pushes the mounting member away, so that the mounting member moves away from the support body. Then, the mounting member may drive the shell connected to the mounting member to move. That is, the first spring 16 rebounds and pushes the first mounting member 14 to drive the upper shell to move, and the second spring 17 rebounds and pushes the second mounting member 15 to drive the lower shell to move, so that a sliding rail of the upper shell and a sliding groove of the lower shell cooperate with each other for sliding, thereby reaching the foregoing relative sliding distance A. That is, in a process of opening the slide phone, the springs in the spring structure implement a semi-automatic opening effect of the shells depending on the elastic force. A working principle of closing the slide phone is similar to the foregoing description, and is not repeatedly described.

In the spring structure in this embodiment, parts such as the first support rod, the second support rod, and the mounting members used for directly connecting to the shells of the slide phone are disposed, thereby solving problems in the prior art of a complicated structure and a high cost of the spring structure, simplifying the structure of the spring structure, and reducing manufacturing costs.

Figure 7:
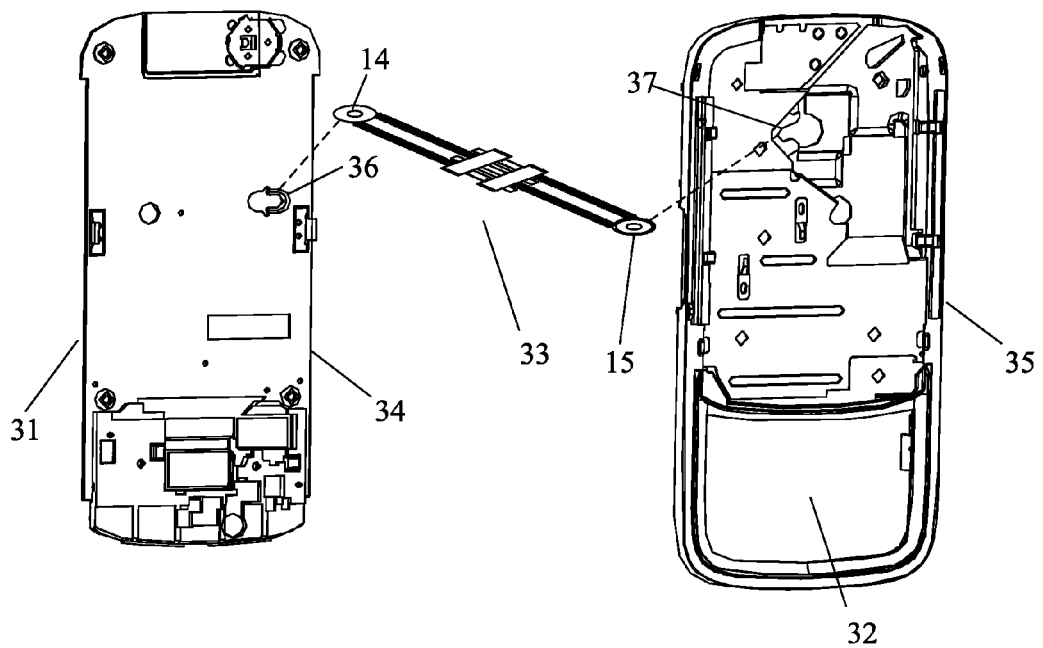
FIG. 7 is a schematic structural diagram of an embodiment of a slide phone according to the present invention.

A third embodiment (Embodiment 3) will be described with respect to FIG. 7. FIG. 7 is a schematic structural diagram of an embodiment of a slide phone according to the present invention. The slide phone in this embodiment may use a spring structure in any embodiment of the present invention.

As shown in FIG. 7, the slide phone includes an upper shell 31, a lower shell 32, and a spring structure 33. A sliding rail 34 is disposed on the upper shell 31, and a sliding groove 35 is disposed on the lower shell. When the slide phone is opened or closed, the sliding rail 34 and the sliding groove 35 may cooperate with each other for sliding, thereby implementing relative sliding of the upper shell 31 and the lower shell 32. The sliding rail and the sliding groove may be designed directly during shell design, which is simple. The sliding rail and the sliding groove are disposed on the shells, saving sheet metal in the prior art, reducing total thickness of a cell phone, and making the cell phone lighter and thinner.

In this embodiment, a first mounting member 14 in the spring structure 33 is connected to the upper shell 31 of the slide phone, and a second mounting member 15 in the spring structure is connected to the lower shell 32 of the slide phone. When a hand pushes the upper shell 31 or the lower shell 32, a corresponding mounting member connected to the shell can be driven by the shell to move, and then drive a connected support rod to move along an installation hole of a support body, so as to compress a spring sleeved on the support rod. When the spring is compressed under stress to a certain limit, the spring may rebound and push the mounting member away, and drive relative sliding between the upper shell and the lower shell, thereby implementing a semi-automatic opening effect of the shells.

The spring structure is disposed and connected to the shells of the cell phone, which, compared with the prior art, simplifies a structure of the spring structure, reduces manufacturing costs of the slide phone, and satisfies light and thin requirements for a cell phone.

Furthermore, in specific implementation, the support rods and the mounting members in the spring structure and the shells may be connected by using multiple kinds of structures. For example, as shown in FIG. 7, a first slot and a second slot may be disposed apart on the first mounting member 14 in the spring structure along a thickness direction. A first bent portion of the first support rod in the spring structure is clamped in the first slot. A first clamping member 36 may be disposed on the upper shell 31, and the first clamping member 36 may be fixedly clamped in the second slot of the first mounting member 14.

A third slot and a fourth slot are disposed apart on the second mounting member 15 in the spring structure along a thickness direction. A second bent portion of the second support rod in the spring structure is clamped in the third slot. A second clamping member 37 may be disposed on the lower shell 32, and the second clamping member 37 may be fixedly clamped in the fourth slot of the second mounting member 15.

In the slide phone in this embodiment, the sliding rail and the sliding groove are disposed on the shells, and parts such as the first support rod, the second support rod, and the mounting members used for directly connecting to the shells of the slide phone are disposed on the spring structure, thereby solving problems in the prior art of a complicated structure and a high cost of the spring structure, simplifying a structure of the spring structure and the slide phone, and reducing manufacturing costs.

Finally, it should be noted that the foregoing embodiments are merely provided for describing the technical solutions of the present invention, but are not intended to limit the present invention. Although the present invention is described in detail with reference to the foregoing embodiments, persons of ordinary skill in the art should understand that they may still make modifications to the technical solutions recorded in the foregoing embodiments, or make equivalent replacements to part of the technical features in the technical solutions; however, these modifications or replacements do not make the essence of the corresponding technical solutions depart from the spirit and scope of the technical solutions of the embodiments of the present invention.

What is claimed is:

1. A spring structure, comprising:
   a support body comprising a first support body and a second support body having installation holes running through each of the first support body and the second support body, the installation holes disposed in a one to one corresponding manner;
   a first support rod having a first end and a second end;
   a second support rod having a first end and a second end;
   a first spring;
   a second spring;
   a first mounting member configured to connect to an upper shell of a slide phone; and
   a second mounting member configured to connect to a lower shell of the slide phone; and
   at least two third springs disposed between the first support body and the second support body, the at least two third springs being sleeved on the first support rod or the second support rod and symmetrically disposed with respect to a longitudinal center line of the first support rod and the second support rod;
   wherein the first end of the first support rod is connected to the first mounting member and the second end of the first support rod penetrates into an installation hole of the first support body and then into an installation hole of the second support body, wherein the first support rod may move along the installation holes in which it is inserted, and wherein the first support rod is sleeved with the first spring between the first mounting member and the installation hole of the first support body in which the first support rod is inserted; and
   wherein the first end of the second support rod is connected to the second mounting member and the second end of the second support rod penetrates into an installation hole of the second support body and then into an installation hole of the first support body, wherein the second support rod may move along the installation holes in which it is inserted, and wherein the second support rod is sleeved with the second spring between the second mounting member and the installation hole of the second support body in which the second support rod is inserted.

2. The spring structure according to claim 1, wherein:
   the first support rod and the second support rod are U-shaped;
   the first support rod comprises a first branch rod and a second branch rod that are parallel to each other, a first bent portion connects the first branch rod and the second branch rod, the first bent portion is connected to the first mounting member, and the first branch rod and the second branch rod are each sleeved with the first spring;
   the second support rod comprises a third branch rod and a fourth branch rod that are parallel to each other, a second bent portion connects the third branch rod and the fourth branch rod, the second bent portion is connected to the second mounting member, and the third branch rod and the fourth branch rod are each sleeved with the second spring; and
   the first branch rod, the second branch rod, the third branch rod, and the fourth branch rod are inserted in the support body in a staggered manner.

3. The spring structure according to claim 2, wherein:
   a first slot and a second slot that are configured to connect to an upper shell of a slide phone are disposed apart on the first mounting member along a thickness direction;
   the first bent portion of the first support rod is clamped in the first slot;
   a third slot and a fourth slot that are configured to connect to a lower shell of the slide phone are disposed apart on the second mounting member along a thickness direction; and
   the second bent portion of the second support rod is clamped in the third slot.

4. The spring structure according to claim 1, wherein a through hole that runs through two end faces is disposed on the first mounting member along a thickness direction.

5. The spring structure according to claim 1, wherein a clamping head is disposed on an end of both the first support rod and the second support rod, wherein the end penetrates out of the support body.

6. The spring structure according to claim 1, wherein the support body comprises a plastic material.

7. The spring structure according to claim 1, wherein the first mounting member and the second mounting member comprise a metal material.

8. A slide phone comprising:
an upper shell;
a lower shell;
a spring structure, comprising:
- a support body comprising a first support body and a second support body having installation holes running through each of the first support body and the second support body, the installation holes disposed in a one to one corresponding manner;
- a first support rod having a first end and a second end;
- a second support rod having a first end and a second end;
- a first spring;
- a second spring;
- a first mounting member connected to the upper shell;
- a second mounting member connected to the lower shell; and
- at least two third springs disposed between the first support body and the second support body, the at least two third springs being sleeved on the first support rod or the second support rod and symmetrically disposed with respect to a longitudinal center line of the first support rod and the second support rod;
- wherein the first end of the first support rod is connected to the first mounting member and the second end of the first support rod penetrates into an installation hole of the first support body and then into an installation hole of the second support body, wherein the first support rod may move along the installation holes in which it is inserted, and wherein the first support rod is sleeved with the first spring between the first mounting member and the installation hole of the first support body in which the first support rod is inserted; and
- wherein first end of the second support rod is connected to the second mounting member and the second end of the second support rod penetrates into an installation hole of the second support body and then into an installation hole of the first support body, wherein the second support rod may move along the installation holes in which it is inserted, and wherein the second support rod is sleeved with the second spring between the second mounting member and the installation hole of the second support body in which the second support rod is inserted;

a sliding rail disposed on the upper shell; and
a sliding groove disposed on the lower shell;
wherein the first mounting member in the spring structure connected to the upper shell of the slide phone; and
wherein the second mounting member in the spring structure connected to the lower shell of the slide phone.

9. The slide phone according to claim 8, wherein:
a first slot and a second slot are disposed apart on the first mounting member in the spring structure along a thickness direction;
a first bent portion of the first support rod in the spring structure is clamped in the first slot;
the second slot is connected to the upper shell of the slide phone;
a third slot and a fourth slot are disposed apart on the second mounting member in the spring structure along a thickness direction;
a second bent portion of the second support rod in the spring structure is clamped in the third slot; and
the fourth slot is connected to the lower shell of the slide phone.

10. A spring structure, comprising:
a support body comprising a first support body and a second support body having installation holes running through each of the first support body and the second support body, the installation holes disposed in a one to one corresponding manner;
a first U-shaped support rod comprising:
- a first end;
- a second end;
- a first branch rod; and
- a second branch rod parallel to the first branch rod; and
- a first bent portion that connects the first branch rod and the second branch rod;
a second U-shaped support rod comprising:
- a first end;
- a second end;
- a third branch rod;
- a fourth branch rod parallel to the third branch rod;
- a second bent portion connects the third branch rod and the fourth branch rod;
a first spring that sleeves the first branch rod and the second branch rod of the first U-shaped support rod;
a second spring that sleeves the third branch rod and the fourth branch rod of the second U-shaped support rod;
a first mounting member configured to connect to an upper shell of a slide phone, wherein the first mounting member is connected to the first bent portion of the first U-shaped support rod, and a first slot and a second slot that connect to an upper shell of a slide phone are disposed apart from each other on the first mounting member along a thickness direction, and the first bent portion of the first support rod is clamped in the first slot; and
a second mounting member configured to connect to a lower shell of the slide phone, wherein the second mounting member is connected to the second bent portion of the second U-shaped support rod, and a third slot and a fourth slot that connect to a lower shell of the slide phone are disposed apart from each other on the second mounting member along a thickness direction, and the second bent portion of the second support rod is clamped in the third slot;
at least two third springs disposed between the first support body and the second support body, the at least two third springs being sleeved on the first U-shaped support rod or the second U-shaped support rod and symmetrically disposed with respect to a longitudinal center line of the first U-shaped support rod and the second U-shaped support rod;
wherein the first end of the first support rod is connected to the first mounting member and the second end of the first support penetrates into an installation hole of the first support body and then into an installation hole of the second support body, and wherein the first support rod may move along the installation holes in which it is inserted; and
wherein the first end of the second support rod is connected to the second mounting member and the second end of the second support rod penetrates into an installation hole of the second support body and then into an installation hole of the first support body, wherein the second support rod may move along the installation holes in which it is inserted; and
wherein the first branch rod, the second branch rod, the third branch rod, and the fourth branch rod are inserted in the support body in a staggered manner.

11. The spring structure according to claim 10, wherein a through hole that runs through two end faces is disposed on the first mounting member along a thickness direction.

12. The spring structure according to claim 10, wherein a clamping head is disposed on an end of both the first support rod and the second support rod, wherein the end penetrates out of the support body.

13. The spring structure according to claim 10, wherein the support body comprises a plastic material.

14. The spring structure according to claim 10, wherein the first mounting member and the second mounting member comprise a metal material.

\* \* \* \* \*